Nov. 18, 1969

J. T. DOTY 3,479,078

AUTOMATIC LATCH AND LOCKING TONGS

Filed Feb. 28, 1968

INVENTOR.
JOHN T. DOTY
BY
*[signature]*
ATTORNEY

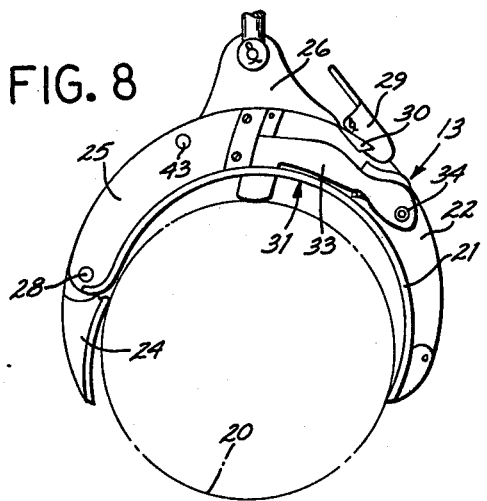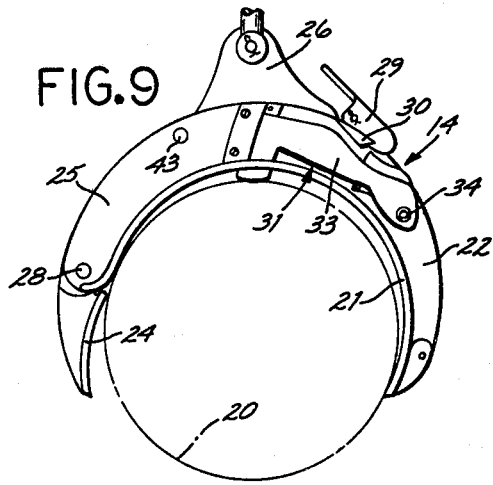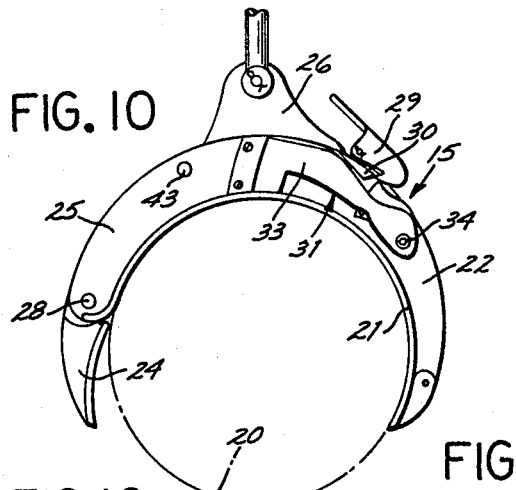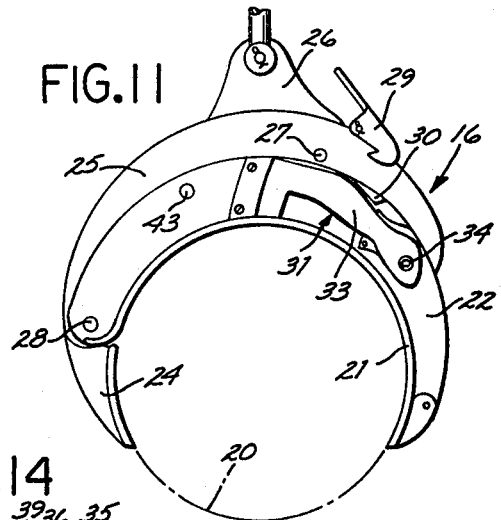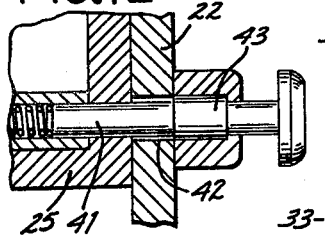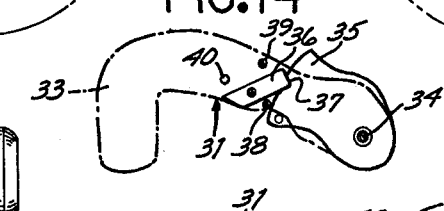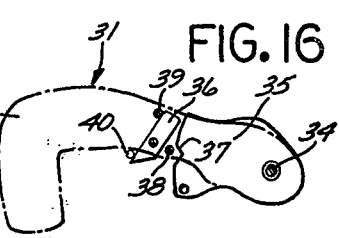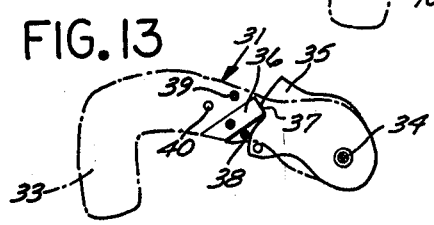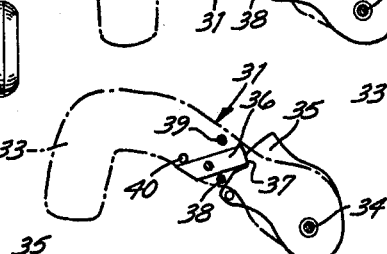
INVENTOR.
JOHN T. DOTY
ATTORNEY United States Patent Office 3,479,078
Patented Nov. 18, 1969

3,479,078
AUTOMATIC LATCH AND LOCKING TONGS
John T. Doty, 9936 East Ramona Ave.,
Bellflower, Calif. 90706
Filed Feb. 28, 1968, Ser. No. 708,934
Int. Cl. B66c 1/62, 3/10
U.S. Cl. 294—104                                7 Claims

ABSTRACT OF THE DISCLOSURE

When handling large cylindrical objects in order to raise or lower them a means is provided to engage or disengage the tongs from the cylindrical object by means of a mechanism engaged by the cylindrical object when the tongs strike the same, also resting the weight of the tongs on the cylindrical object it is not possible to disengage them without a manual manipulation.

---

An object of my invention is to provide a novel tongs which will be tripped by an automatic latch mechanism when the tongs strike an object which is to be grasped.

Another object of my invention is to provide a novel automatic tongs of the character stated in which the tongs can be released from the engaged object by lowering the weight of the tongs against the object which permits the tongs to be opened and permit disengagement.

Still another object of my invention is to provide a novel automatic tongs of the character stated which are spring pressed to a latched position when a latch mechanism on the tongs is tripped by engaging the object to be lifted.

This invention is an improvement on my previous Patent No. 3,068,036, Dec. 11, 1962 and Patent No. 3,011,821, Dec. 5, 1961.

Other objects, advantages and features of invention may appear from the acompanying drawing, the subjoined detailed description and the appended claims.

IN THE DRAWING

FIGURE 8 is a side elevation of my tongs in tripping position.

FIGURE 9 is a side elevation of my tongs in partially closed position.

FIGURE 10 is a side elevation of my tongs in a further partially closed position.

FIGURE 11 is a side elevation of my tongs in fully closed position.

FIGURE 12 is an enlarged sectional view of the latch pin taken on line 12—12 of FIGURE 2.

FIGURE 13 is a diagrammatic view of the latch mechanism viewed from the direction of the arrow 13 in FIGURE 8.

FIGURE 14 is a diagrammatic side view of the latch mechanism as viewed in the direction of the arrow 14 in FIGURE 9.

FIGURE 15 is a diagrammatic side elevation of the latching mechanism as viewed in the direction of the arrow 15 in FIGURE 10.

FIGURE 16 is a diagrammatic view of the latching mechanism as viewed in the direction of the arrow 16 in FIGURE 11.

Figure 1:
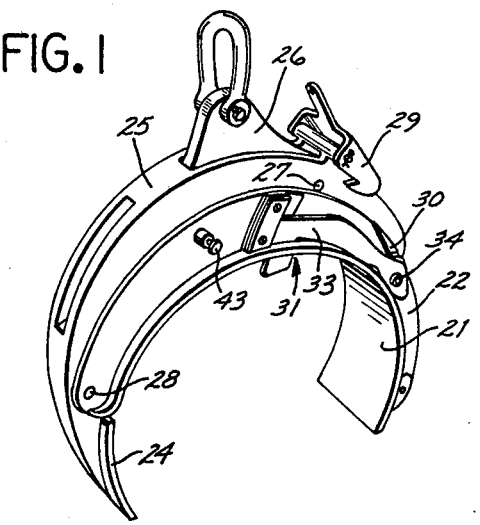
FIGURE 1 is a perspective view of my tongs.
Figure 2:
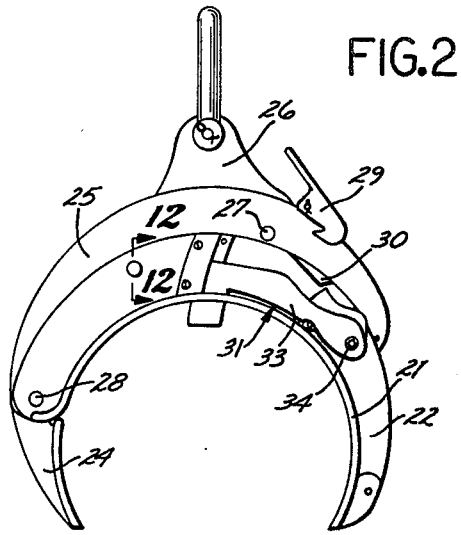
FIGURE 2 is a side elevation of my tongs in closed position.

Referring more particularly to the drawing, my automatic latch and unlatch tongs are adapted to engage a cylindrical object 20 through an area somewhat greater than an arc of 180°. The principal gripping portion of the tongs consists of an arcuate shoe 21 which is equalled to or somewhat less than an arc of 180° in length. This portion of the tongs can therefore be readily placed against the object 20 and will partially encircle the same. A pair of flanges 22-23 project upwardly from the shoe 21 and are arranged substantially at right angles to the surface of this shoe. The flanges 22-23 are a fixed part of the shoe 21, that is, this structure is substantially U-shaped in cross section. A segment or swinging shoe 24 also engages the outer surface of the object 20 and this segment or second shoe in combination with the main shoe 20 partially encircles the object 20 for a distance somewhat greater than an arc of 180°. The shoe or segment 24 is fixedly attached to or it may be an integral part of an arcuate lifting arm 25. The arm 25 is curved to approximate the same arc as the shoe 21 so that in the lowered position of the arm it will engage and rest upon the upper surface of the shoe 21 and between the flanges 22-23. A cam shoe 26 is pivotally attached to the arm 25, the outer end of the arm being bifurcated to accommodate the cam 26. One end of the cam 26 bears against the shoe 21 for the purpose of lifting or camming one end of the arm 25 upwardly when a lifting force is exerted on the cam arm 26 this lifting force being a suitable cable or crane arm. When the cam arm 26 is pulled upwardly it will swing on the pivot 27 thus causing one end of the cam arm to engage the shoe 21 and thus lift the arm 26 on its pivot thereby causing the segment 24 to swing inwardly and grip the object 20. The arm 25 is pivotally attached to the flanges 22-23 and between these flanges by means of a pivot pin 28.

In order to hold the shoe 21 and the segment 24 in open position, that is where these parts do not engage the object 20, I provide a pivoted catch 29 which is pivotally attached to the arm 25 adjacent one end of this arm. The catch 29 engages outwardly projecting lugs 30 on the flanges 22-23 to hold the arm 25 in position where the segment 24 is held in non-engaging position.

To provide a latch and unlatch means for the catch 29 I provide an automatic latching mechanism 31 as follows: A compression spring 32 extends between the shoe 21 and the one end of the arm 25 to urge the one end of these members apart and cause the arm 25 to pivot around the pin 28, that is, the spring 32 tends to urge the tongs to a closed position. When the tongs are in their open position the spring 32 is compressed and when the catch 29 disengages the lugs 30 the tongs will be pressed into their closed position and the object 20 will be engaged.

The latch mechanism 31 consists of a finger 33 which is pivotally mounted at 34 between the flanges 22-23. The other end of the finger 33 extends downwardly through the shoe 21 as shown. Thus the finger 33 will be pushed upwardly around its pivot pin 34 by the object 20 as shown in FIGURES 8, 9, 10 and 11. When the finger 33 is pushed upwardly by the object 20 it will engage and remove the catch 29 from the lugs 30 thus permitting the spring 32 to swing the tongs into a closed position with the shoe 21 and segment 24 engaging the object 20. This is accomplished by the following mechanism: A plate 35 is also pivoted on the pivot pin 34 and is engaged by a bar 36 which is pivotally mounted on one face of the finger 33. This structure is best shown on FIGURES 13–16 inclusive. The bar 36 enters a notch 37 in one end of the plate 35 thus causing the plate to swing with the finger 33 as it is pushed upwardly by the object 20. As the plate 35 thus swings upwardly it will engage the catch 29 and swing the catch around its pivot to disengage the lugs 30. This will release the latch mechanism and permit the tongs to close.

The bar 36 is limited in its swinging movement on the fingers 33 by the projecting pins 38, 39 and 40. The pin 40 extends horizontally from the flange 22. When the finger 33 is pushed upwardly by engagement with the object 20 and after the jaws have been swung inwardly by the spring 32, the pin 40 will then engage and release the bar 36 from the latch plate to permit the latch plate 35 to drop downwardly to the position shown in FIGURE 16. This releasing of the plate 35 permits the latch 29 to re-engage the part 30 and again hold the tongs in the open position upon subsequent lowering of the tongs. Thus the latch mechanism is re-loaded and ready for any subsequent grappling engagements.

When the tongs are in a closed position, that is when the segment 24 engages the object 20 as shown in FIGURE 11, the arm 25 will be held in this engaging position by means of the spring pressed pin 41 which is imbedded in the arm 25 and is pressed outwardly to enter the hole 42 in the flange 22 of the shoe 21. A releasing cylinder 43 is slideably mounted in the flange 22 and engages the outer end of the pin 41 to press that pin inwardly against spring tension to manually release the parts from their engaging position so that the tongs can be re-cocked in an open position and ready for another grappling operation. Thus the tongs cannot be accidentally opened but must be manually released to permit the parts to extend to an open position. Also, the tongs cannot close accidentally since it is necessary for the object 20 to engage and push the finger 33 upwardly thus releasing the catch 29 and permitting the spring 32 to function and press the parts of the tong into closed or engaging position.

IN OPERATION

Figure 3:
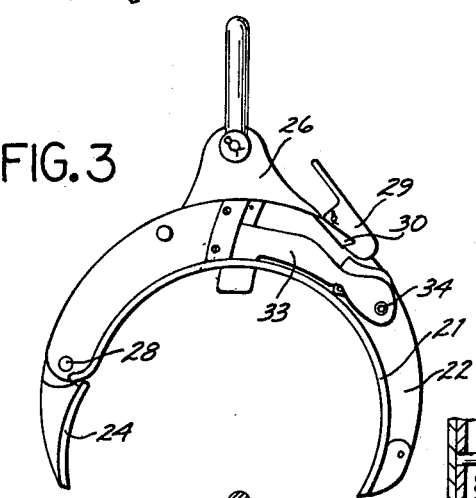
FIGURE 3 is a side elevation of my tongs in open position.
Figure 4:
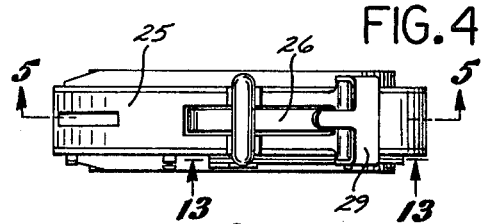
FIGURE 4 is a top plan view of my tongs.
Figure 7:
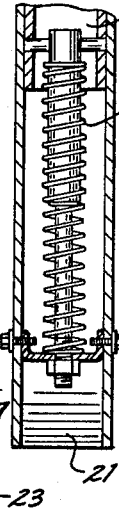
FIGURE 7 is a fragmentary side view of the tongs taken on line 7—7 of FIGURE 5.
Figure 6:
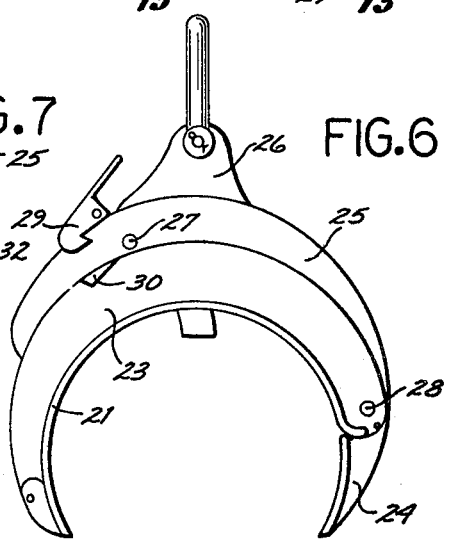
FIGURE 6 is a side elevation of my tongs in closed position and on the side opposite that shown in FIGURE 2.
Figure 5:
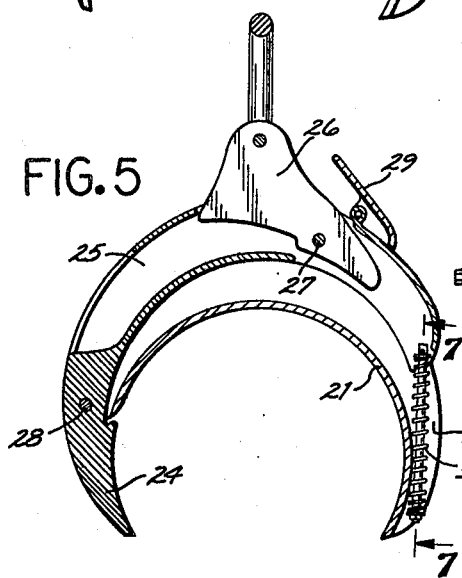
FIGURE 5 is a sectional view taken on line 5—5 of FIGURE 4.

The shoe 21 and the segment 24 are held in an open or extended position shown in FIGURE 3 by engaging the catch 29 with the lugs 30. The tongs are now lowered on a cable or boom over the object 20 and the finger 33 will engage the object 20 causing this finger and the plate 35 to swing around the pivot pin 34. The plate 35 will move with the finger 33 because of the engagement of the bar 36 with the notch 37 in the plate 35. The lowering movement of the tongs continues until the plate 35 engages and releases the catch 29 from the lugs 30. The spring 32 now presses the shoe 21 and the segment 24 against the object 20 by swinging the arm 25 around its pivot pin 28. The spring latch pin 41 now enters the hole 42 and holds the tongs in closed position and prevents accidental disengagement of the tongs with the object 20. To release the object 20 it is necessary to push the cylinder 43 inwardly which disengages the pin 41 from the flange 22 and permits the tongs to be moved to the open or disengaging position.

Having described my invention, I claim:

1. A latching tongs comprising an arcuate shoe engageable with an object to be lifted, and arcuate arm arranged in juxtoposition with said shoe, means pivotally mounting said arm on the shoe, a cam arm pivotally attached to the arcuate arm, one end of the cam arm being engageable with said shoe, spring means extending between the arcuate shoe and the arm to urge said shoe and arm into a contracted position, a catch pivotally mounted on said arcuate arm, means on the arcuate shoe releasably engaged by said catch and latch means on said arcuate shoe engageable with said catch to release the catch from engagement with said means on the arcuate shoe.

2. A latching tongs are recited in claim 1 and said spring means consisting of a coil spring extending between adjacent ends of the arcuate shoe and arcuate arm.

3. A latching tongs as recited in claim 1 and said latch means including a finger pivotally mounted on the arcuate shoe, and engageable by the lifted object to swing said finger against the catch to release the catch.

4. A latching tongs as recited in claim 1 and said latch means including a finger pivotally mounted on the arcuate shoe and engaged by the lifted object to swing said finger against the catch to release the catch, a plate pivotally mounted on said finger, said plate engaging the catch to release the catch and a bar pivotally mounted on said finger releasably engaging the plate to move said plate with the finger.

5. A latching tongs as recited in claim 1 and said latch means including a finger pivotally mounted on the arcuate shoe and engageable by the lifted object to swing said finger against the catch to release the catch, a plate pivotally mounted on said finger, said plate engaging the catch to release the catch, and a bar pivotally mounted on said finger, releasably engaging the plate to move said plate with the finger, and means on the finger engageable with said bar to limit the pivotal movement of said bar on the finger.

6. A latching tongs as recited in claim 1, said spring means consisting of a coil spring extending between adjacent ends of the arcuate shoe and arcuate arm, said latch means including a finger pivotally mounted on the arcuate shoe and engageable by the lifted object to swing said finger against the catch to release the catch.

7. A latching tongs as recited in claim 1, and said spring means consisting of a coil spring extending between adjacent ends of the arcuate shoe and arcuate arm, said latch means including a finger pivotally mounted on the arcuate shoe and engageable by the lifted object to swing said finger against the catch to release the catch and a plate pivotally mounted on said finger, said plate engaging the catch to release the catch and a bar pivotally mounted on said finger releasably engaging the plate to move said plate with the finger.

References Cited

UNITED STATES PATENTS

| 369,230 | 8/1887 | Chappell | 294—110 X |
| 900,889 | 10/1908 | Schuster | 294—110 X |
| 369,230 | 8/1887 | Chappell | 294—110 X |
| 900,889 | 10/1908 | Schuster | 294—110 X |

GERALD M. FORLENZA, Primary Examiner

G. F. ABRAHAM, Assisted Examiner

U.S. Cl. X.R.

294—110